A. B. LANDIS.
VARIABLE SPEED GEARING.
APPLICATION FILED JAN. 17, 1911.
1,015,808.
Patented Jan. 30, 1912.
4 SHEETS—SHEET 3.
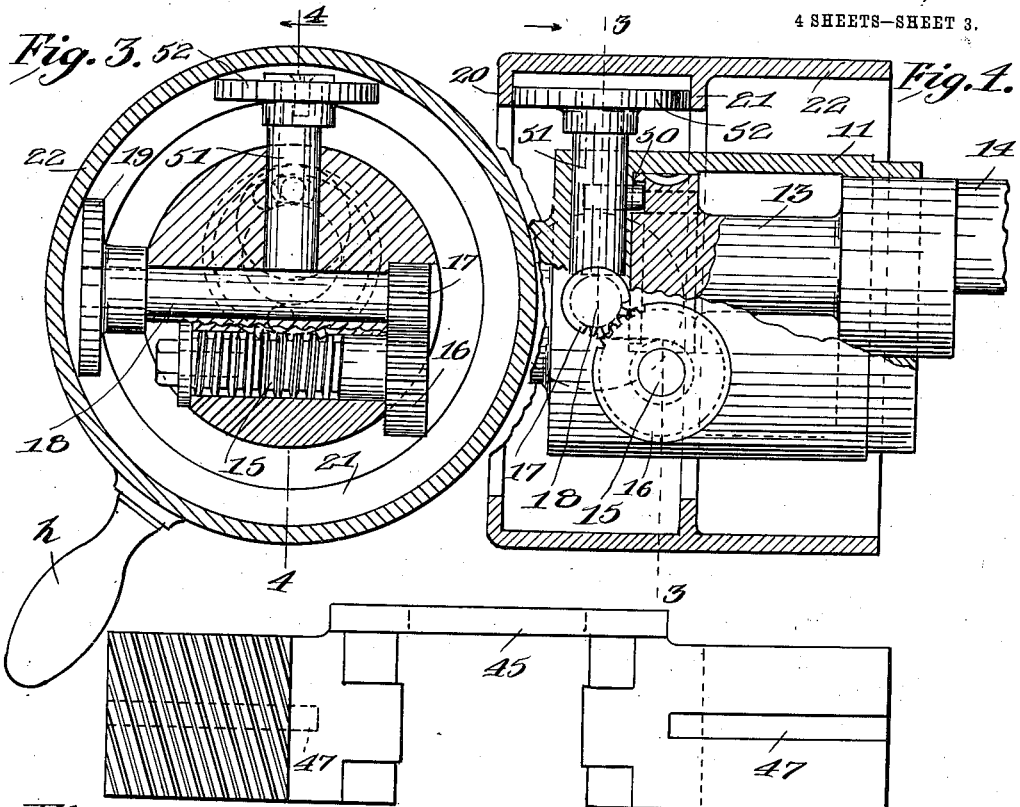
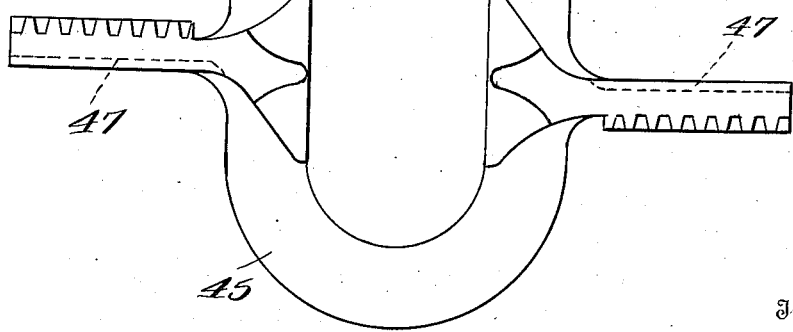
Witnesses
L. A. Price
W. H. Rockwell
Inventor
Abraham B. Landis,
By E. W. Bradford
Attorney A. B. LANDIS.
VARIABLE SPEED GEARING.
APPLICATION FILED JAN. 17, 1911.
1,015,808.
Patented Jan. 30, 1912.
4 SHEETS—SHEET 4.
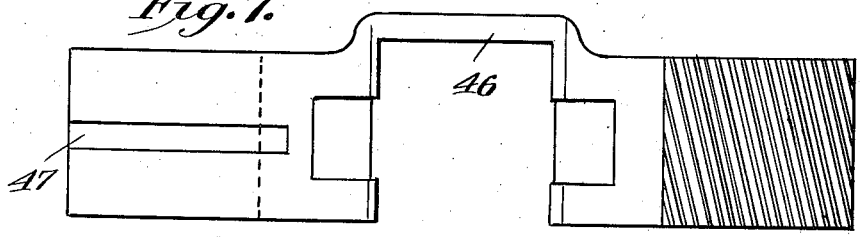
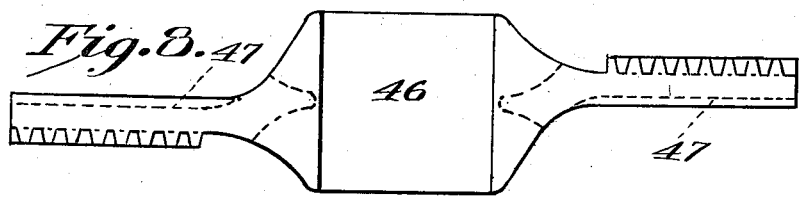
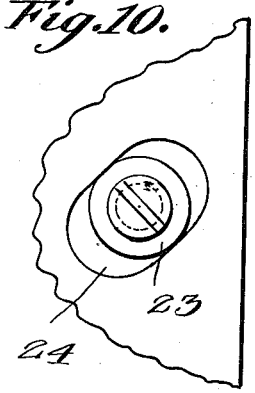
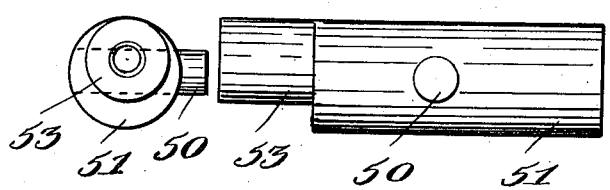
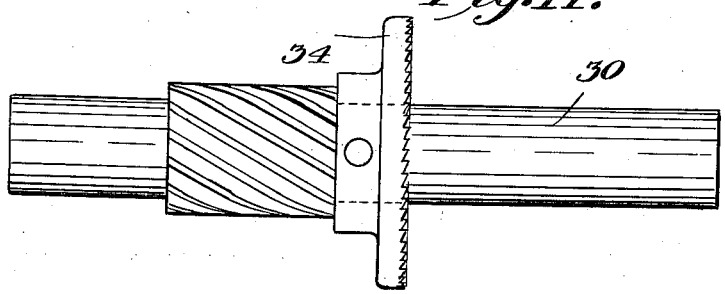
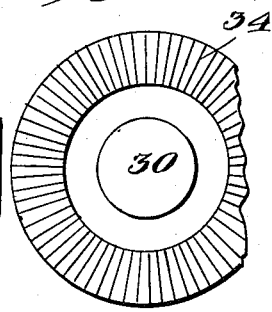
Witnesses
L. A. Price
W. H. Rockwell
Inventor
Abraham B. Landis,
per, E. W. Bradford
Attorney

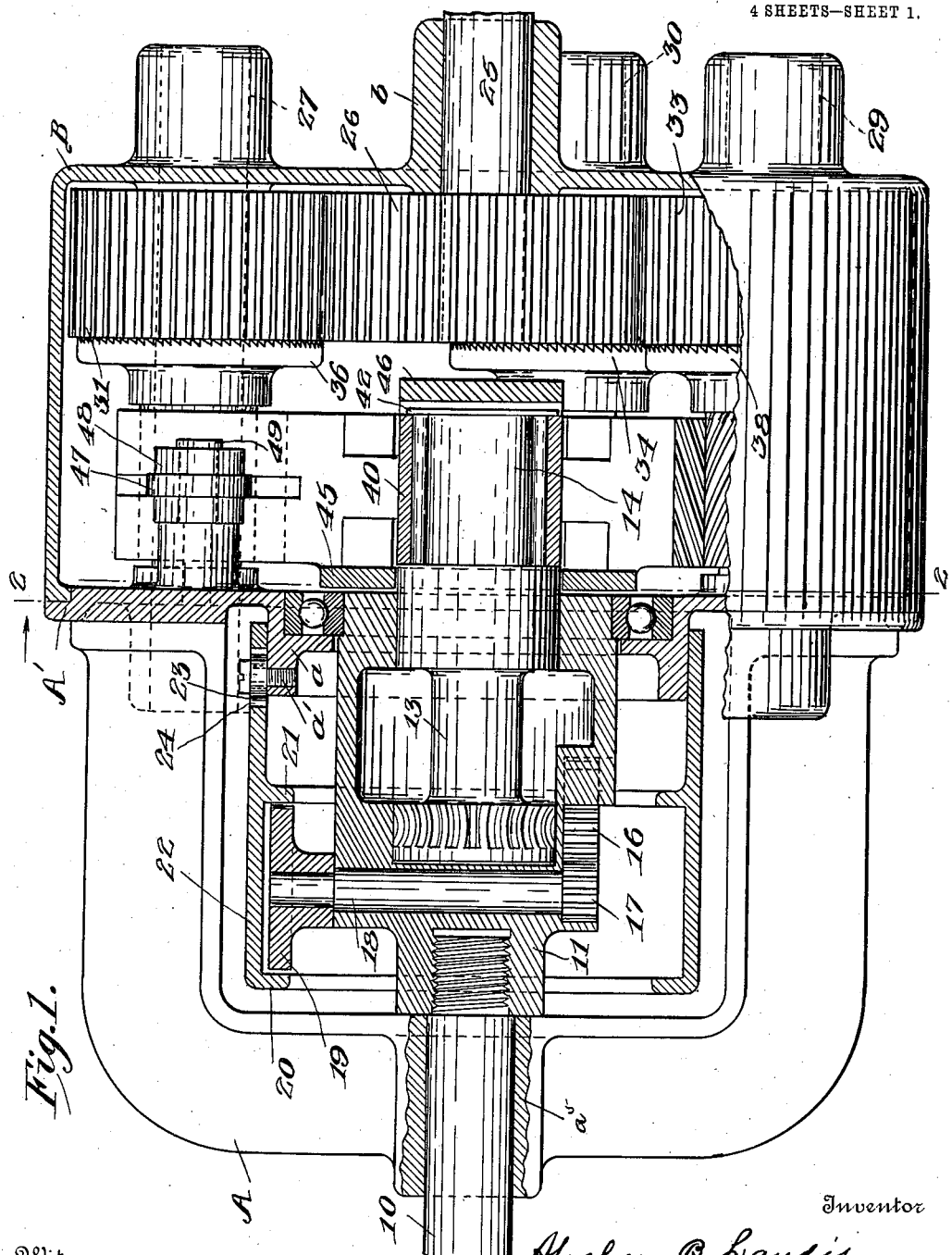

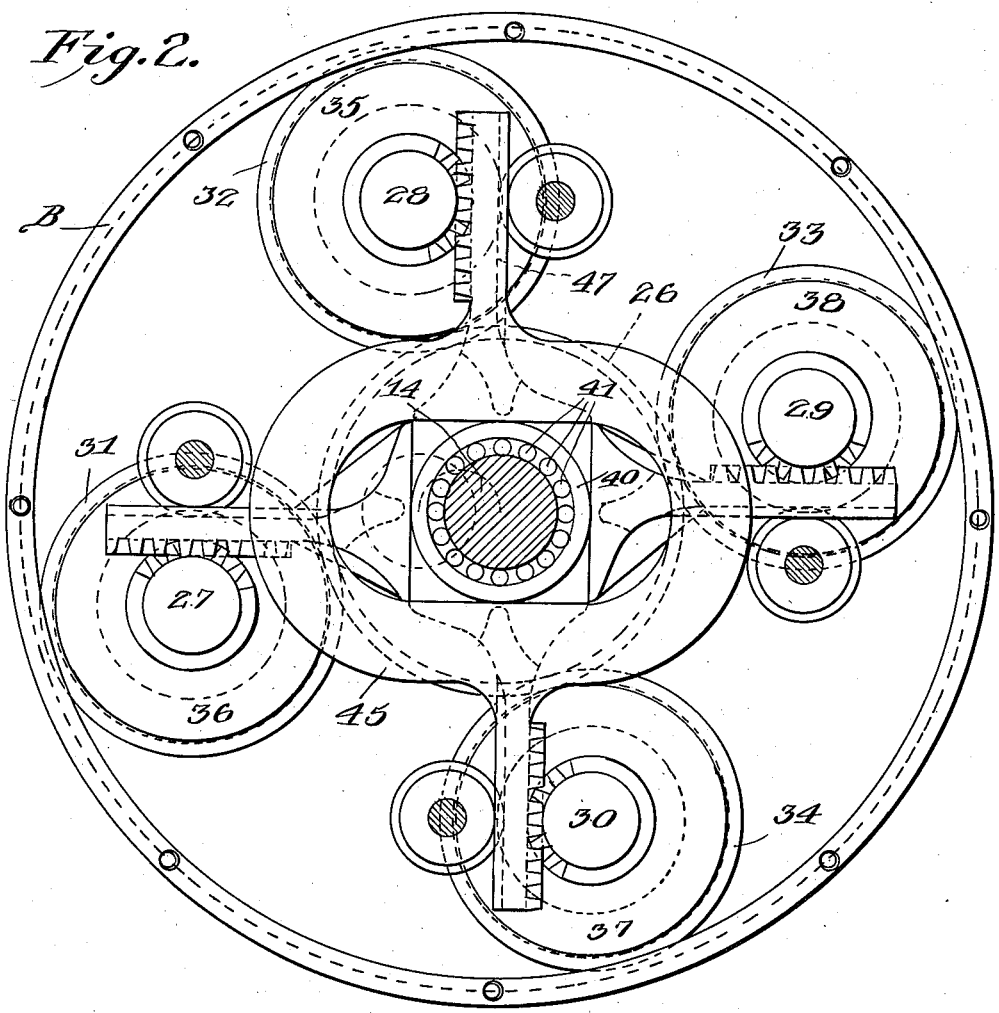

UNITED STATES PATENT OFFICE.

ABRAHAM B. LANDIS, OF ENFIELD, PENNSYLVANIA.

VARIABLE-SPEED GEARING.

1,015,808.   Specification of Letters Patent.   Patented Jan. 30, 1912.

Application filed January 17, 1911. Serial No. 603,124.

*To all whom it may concern:*

Be it known that I, ABRAHAM B. LANDIS, a citizen of the United States, residing at Enfield, in the county of Montgomery and State of Pennsylvania, have invented certain new and useful Improvements in Variable-Speed Gearing, of which the following is a specification.

My said invention consists in an improved construction of variable speed gearing wherein the speed may be changed gradually, and while the mechanism is in rapid operation, from the slowest speed to any speed desired up to the maximum speed for which the gearing is adapted, or reversely, and wherein the drive is positive at all times, all as will be hereinafter more fully described and claimed.

Referring to the accompanying drawings which are made a part hereof and on which similar reference characters indicate similar parts, Figure 1 is a view chiefly in central longitudinal section along the line of the driving shaft but with the gearing in the gear casing in edge elevation, Fig. 2 a cross section looking in the direction indicated by the arrows from the dotted line 2—2 in Fig. 1, Fig. 3 a detail section on the dotted line 3—3 in Fig. 4, Fig. 4 a cross section looking in the direction indicated by the arrows from the dotted line 4—4 in Fig. 3, Fig. 5 a side elevation of one of the double rack-bars forming a part of the structure, Fig. 6 an edge elevation thereof, Figs. 7 and 8 views similar to Figs. 5 and 6 showing the form of the other rack-bar, and Figs. 9, 10, 11 and 12 detail views to illustrate the several parts more clearly.

In said drawings the portions marked A represent the frame, and B the gear casing. The frame A is in the form of a U having a bearing $a^5$ in its hub through which the driving shaft 10 extends. On its forward end is secured a heavy plate A' formed to support the inner bearings, as will be presently described. The casing B is of appropriate form to inclose the gearing and is secured to plate $A^1$ as best shown in Fig. 1.

The driving, or motor shaft, 10 extends through a bearing $a^5$ in the center of frame A and is formed with a screw-threaded inner end on which is mounted a housing 11 adapted to rotate therewith. Said housing 11 is formed with suitable bearings arranged eccentric to shaft 10 in which a crank-shaft 13 is mounted having a crank-pin 14 on its outer end, which extends within the casing B. Said crank-pin is arranged so that at one point in the revolution of crank-shaft 13 its axis will be in line with the axis of shaft 10. Said crank-shaft 13 is secured to rotate with, and also arranged to be rotated in relation to housing 11 by means of a transverse screw 15 secured in said housing and engaging with screw-threads in a circumferential groove in the periphery of the inner end of said crank-shaft. A pinion 16 is mounted on one end of said screw 15 which engages with a pinion 17 on another transverse shaft 18. Said shaft 18 has a friction wheel 19 on one end which is arranged to run between two flanges 20 and 21 formed on a casing 22 which surrounds housing 11 and is connected to plate $A^1$ by engaging an annular flange $a$ formed thereon, being held in place by means of a series of angular slots 24 in said casing 22 which engage rollers 23 mounted on the outer ends of correspondingly arranged studs $a'$ projecting from said flange $a$. By rotating casing 22 by means of a handle $h$, lever, or other connection, the angular slots will serve to slide it longitudinally, according to the direction of motion, so as to throw either flange 20 or 21 into contact with the rim of friction wheel 19. Housing 11 being in motion said friction wheel will thus operate to turn shaft 18, and through the pinions 16 and 17 will turn the screw 15 to turn the crank-shaft in its bearings in housing 11 to throw the crank-pin 14 so that its axis will move toward or from the axial line of driving shaft 10. While I have shown, in Fig. 3, the handle $h$ for turning the casing 22, it will be understood that a system of connecting rods and levers may run to any point desired for operating this part, so that by the use of a foot lever, for example, the casing may be slid to operate friction wheel 19 in either direction and thus increase or decrease the speed of the driven shaft at will. In order to prevent the crank-shaft from being turned beyond the limit intended, I form a curved slot in its outer end with which a projecting pin 50 in the side of a shaft 51 is adapted to engage. Said shaft 51 is mounted in a seat in the end of housing 11 and has a wheel 52 mounted on an eccentric part 53 on its outer end. As the crank-shaft 13 reaches the limit of the motion the end of the curved slot strikes pin 50 turning shaft 51 and by means of the eccentric outer end throws the wheel 52 against the appropriate flange 20 or 21 of the casing 22 and slides said casing out of its contact with friction wheel 19, thus stopping the operation of shaft 18 and the connected parts.

The driven shaft 25 is journaled in a bearing $b$ in the center of casing B in line with the driving shaft 10 and has a gear-wheel 26 on its inner end. A series of shafts 27, 28, 29 and 30 are mounted 90° apart, one end of each in a bearing in casing B, its other end in a bearing in plate A', thus extending entirely across the gear casing. They are each supported to have a slight longitudinal movement in their bearings, for a purpose to be presently described. Said shafts carry loosely mounted pinions 31, 32, 33 and 34, respectively, each of which meshes with the gear-wheel 26 on shaft 25. The inner faces of each of said wheels 31, 32, 33 and 34 are formed toothed, or as clutch parts, and disks 35, 36, 37 and 38 are rigidly secured on said shafts 27, 28, 29 and 30, respectively, and formed with toothed faces adapted to engage with the toothed faces of said pinions. The shaft of each disk has a bushing thereon with spiral teeth, or grooves, in its periphery, as shown most clearly in Figs. 1 and 11, or said spiral teeth may be formed in the shaft itself.

A sleeve 40 surrounds the crank-pin 14 of crank-shaft 13, a series of anti-friction rollers 41 being interposed between said crank-pin and said sleeve, the sleeve and pins being held in position by a cap 42 secured to the outer end of said crank-pin. Two sets of rack-bars extending at right angles to each other and connected by yokes 45 and 46 respectively are mounted with their inner ends resting on said sleeve. Each rack-bar has spiral teeth adapted to engage with the spiral teeth on one of the shafts of the toothed disks. Said rack-bars are of the form best illustrated in Figs. 5, 6, 7 and 8. The yoke 45 is oval and has a long slot to surround and accommodate the adjustments of the crank-pin and the yoke 46 is straight, passing across the outer end of said crank-pin. The rack-bars on one yoke extend toward the adjacent side of the other yoke, or, as best shown in Fig. 1, across the space between the yokes, their inner ends being formed with wide faces to rest on sleeve 40 and with central inter-meshing cut-out portions as indicated in Figs. 5, 6, 7 and 8 to allow their inner ends to pass each other and permit of their free reciprocation during the operation of the crank-shaft. The rack-bars of each yoke are oppositely arranged, as shown, so as to engage on the same side of opposite shafts so that while the rack-bar on one end of either yoke is operating its shaft in one direction the rack-bar on the opposite end of the same yoke will operate its shaft in the reverse direction. A groove 47 is formed in the back of each rack-bar which engages with a circumferential flange 47 on a roller 48 mounted on a stud-shaft 49, which extends out from plate A'. Said rollers 48 are fixed against longitudinal movement on said stud-shafts and thus the rack-bars are not only held into engagement with the shafts carrying the toothed disks, but are also held from movement longitudinally thereof.

In operation the mechanism being arranged as shown in Fig. 1, the axis of crank-pin 14 of the crank-shaft is directly in line with the axis of driving shaft 10 so that the rotation of said shaft will cause no reciprocation of the rack-bars and therefore will transmit no movement to shaft 25. It being desired to start the driven shaft in motion, the operator, by lever $h$ throws housing 22 in the appropriate direction, which operates, through the friction disk 19 and the connecting gear to turn crank-shaft 13 in its bearings in housing 11, throwing the crank-pin 14 off center and starting the rack-bars in reciprocation. From the arrangement illustrated, which will be best understood by an inspection of Figs. 1 and 2, it will be seen that the rack-bars are operated successively, one after another, to rotate the shafts carrying the toothed disks in a forward direction, and while the rack-bar which is being forced outwardly drives the shaft with which it engages in a forward direction, the rack-bar on the opposite side of the same yoke turns the opposite shaft in a reverse direction. By reason of the spiral arrangement of the grooves the disk driven forward is forced into engagement with the clutch teeth on the face of the pinion on that shaft and said pinion is thus rotated in a forward direction, while the disk on the opposite shaft is withdrawn from engagement with its pinion and thus said pinion is left idle. As each rack-bar reaches the limit of its forward motion the crank begins forcing the next rack-bar forward so that as the forward motion of the wheel 26 is dropped by one pinion it is taken up by the next and continued, each pinion acting one after another in rapid succession so that the motion of the gear 26 and shaft 25 is constant. The speed may be regulated as desired by the adjustment of crank-shaft 13 in relation to housing 11, as before described, giving the crank a throw of such distance as may be required to impart to the driven shaft the speed desired and such adjustment is effected by the power of the engine itself and may be applied without regard to the speed of the mechanism.

Having thus fully described my said in- vention, what I claim as new and desire to secure by Letters Patent, is:

1. In a variable speed gearing, the combination of a driving shaft, a gear casing, a driven shaft journaled in said gear casing in line with said driving shaft, a crank-shaft carried by said driving shaft and mounted eccentrically thereto, means for adjusting said crank-shaft in its bearings to throw the axis of its crank toward or from the axial line of the driving shaft, reciprocating rack-bars arranged to be operated by said crank, countershafts arranged to be driven successively by said rack-bars, and gearing connecting said counter-shafts with said driven shaft, substantially as set forth.

2. A variable speed gearing comprising a driving shaft, a gear casing, a driven shaft journaled in line with said driving shaft, a crank on the inner end of said driving shaft, means for adjusting said crank in relation to the axial line of the driving shaft, a gear on the driven shaft, loose gears on said counter-shaft meshing with said gear on said driven shaft, clutch mechanism adapted to lock said loose gears on said counter-shafts when driven in one direction, and reciprocating rack-bars connected with the crank of said driving shaft to be operated thereby and arranged to operate said counter-shafts successively, substantially as set forth.

3. A variable speed gearing comprising a driving shaft, a gear casing, a housing on the inner end of said driving shaft, a crank-shaft fixed in eccentric bearings in said housing, means for securing and adjusting said crank-shaft to throw the axis of the crank-pin toward or from the axis of said driving shaft, a driven shaft journaled in said gear casing, a gear on said driven shaft, counter-shafts journaled in said gear casing surrounding said driven shaft, loose gears on said counter-shafts meshing with the gear on said driven shaft, clutch devices for locking said loose gears to said counter-shafts when driven in one direction, rack-bars engaging with the said counter-shafts for oscillating the same, the inner ends of said rack-bars being connected to be operated by the crank carried by said driving shaft, substantially as set forth.

4. A variable speed gearing comprising a driving shaft carrying a variable throw crank-pin, means operated by the driving shaft for varying the throw of said crank, a driven shaft, and gearing intermediate of said driven shaft and said variable throw crank for operatively connecting the driving shaft and driven shaft, substantially as set forth.

5. A variable speed gearing comprising a driving shaft carrying a variable throw crank, means operated by power from said driving shaft for varying the throw of said crank, a driven shaft, and gearing connecting said crank with said driven shaft, substantially as set forth.

6. A variable speed gearing comprising a driving shaft, a driven shaft, intermediate gearing connecting said driving shaft with said driven shaft, said intermediate gearing comprising a variable throw crank, and reciprocating rack-bars operated by said crank, substantially as set forth.

7. A variable speed gearing comprising a driving shaft, a driven shaft, gearing connecting said shafts, which gearing comprises a variable throw crank operated by said driving shaft and connected with means for varying the throw, which means is operated by said driving shaft, substantially as set forth.

8. A variable speed gearing comprising a driving shaft, a housing carried on the inner end of said driving shaft, a crank-shaft mounted in eccentric bearings in said housing, a transverse screw engaging with threads in said crank-shaft for holding and adjusting it in its eccentric bearings, a gear connection between said screw and an operating shaft, a friction disk on said operating shaft adapted to contact with appropriate surfaces for operating the same in either direction, a driven shaft, and intermediate gear between said driven shaft and said crank for transmitting motion from the driving shaft to the driven shaft, substantially as set forth.

9. A variable speed gearing comprising a driving shaft, a crank-shaft mounted in eccentric bearings in the inner end of said driving shaft, a holding and adjusting screw engaging with threads in the periphery of said crank-shaft, gearing for operating said screw comprising a shaft carrying a friction wheel, a casing with friction faces for said wheel to operate upon, means for sliding said casing to throw one or the other of said faces into contact with said friction wheel, a driven shaft, and intermediate gearing connecting said driven shaft to the crank of said crank-shaft, substantially as set forth.

10. A variable speed gearing comprising a driving shaft, a driven shaft, a series of counter-shafts surrounding said driven shaft, a gear wheel fixed on said driven shaft, gear wheels loosely mounted on said counter-shaft and engaging with said gear on the driven shaft and formed with clutch faces, clutch parts mounted on said counter-shafts and adapted to engage with the clutch faces of said loosely mounted gears, said shafts being provided with spiral grooves on their peripheries, reciprocating rack-bars connected to be operated by the crank carried by the driving shaft and formed with angular teeth for engagement with said spiral grooves, said spirals being arranged to force said clutch parts into engagement with the clutch faces of the gears when forced outwardly and withdraw them from engagement when drawn inwardly by the operation of said crank, substantially as set forth.

11. A variable speed gearing comprising a driving shaft, a driven shaft, intermediate gearing connecting said driven shaft with said driving shaft, said gear comprising loosely mounted gear wheels meshing with a gear wheel fixed on said driven shaft, and reciprocating rack-bars operated by a crank carried by said driving shaft, said rack-bars being connected with the operating shafts by inclined or spiral teeth whereby the forward motion engages the clutches and the backward motion disengages them, substantially as set forth.

12. A variable speed gearing comprising a driving shaft, a variable throw crank on the end of said driving shaft, means for varying said throw, a driven shaft, gearing connecting said driven shaft with the crank of said driving shaft comprising reciprocating rack-bars operated by said crank and held into engagement with the driving shafts by means of fixed bearings engaging with said rack-bars to hold them against sidewise movement, substantially as set forth.

13. A variable speed gearing comprising a driving shaft having a crank on its inner end, a driven shaft, intermediate gearing for connecting said driving shaft and said driven shaft, said gearing comprising clutch mechanism adapted to engage and disengage by longitudinal movement of one of the clutch parts, and reciprocating rack-bars connected with the driving shafts of said parts by means of inclined or spiral connections, whereby the reciprocation of said rack-bars in one direction engages said clutch parts and in the opposite direction disengages said clutch parts, substantially as set forth.

14. A variable speed gearing comprising a driving shaft, a crank on its inner end, a driven shaft, a gear carried thereby, counter-shafts surrounding the inner ends of said driving shaft and driven shaft and loosely mounted gears carried thereby adapted to engage with the gear on the driven shaft, said loosely mounted gears being formed with clutch faces, clutch parts mounted on said shafts, and means for operating and sliding said shafts to engage said clutch parts and operate said gears comprising reciprocating rack-bars operatively connected with the crank on the driving shaft and engaging said other shafts with inclined or spiral toothed engagements, substantially as set forth.

15. A variable speed gearing comprising a driving shaft provided with a crank on its inner end, a sleeve or bushing surrounding the crank-pin, anti-friction rollers between said sleeve and crank pin, reciprocating rack-bars formed with their inner ends resting upon said sleeve and their outer ends engaging with clutch carrying shafts, a driven shaft, a gear on said driven shaft, gears loosely mounted on said clutch shafts engaging with said gear on the driven shaft, and means for holding said rack-bars in operative position, substantially as set forth.

16. A change speed gearing comprising a driving shaft, a variable throw crank carried thereby, means operated by the engine for varying the throw of said crank, means for automatically disengaging said operating means at the limit of the movement of the crank-shaft, a driven shaft, and intermediate gearing operatively connecting said driven shaft with the crank of said crank-shaft, substantially as set forth.

In witness whereof, I, have hereunto set my hand and seal at Washington, District of Columbia this 13th day of January, A. D. nineteen hundred and eleven.

ABRAHAM B. LANDIS. [L. S.]

Witnesses:
  J. D. YOAKLEY,
  E. W. BRADFORD.